United States Patent [19]

Womble et al.

[11] 4,015,801
[45] Apr. 5, 1977

[54] MANEUVERABLE, RAM AIR INFLATED, FLEXIBLE AERIAL WING

[76] Inventors: William H. Womble, 186 Eldridge St., Manchester, Conn. 06040; John D. Campbell, 8764 Croydon Ave., Los Angeles, Calif. 90045

[22] Filed: Oct. 30, 1975

[21] Appl. No.: 627,118

Related U.S. Application Data

[63] Continuation of Ser. No. 528,722, Dec. 2, 1974, abandoned.

[52] U.S. Cl. .............................................. 244/145
[51] Int. Cl.² ........................................ B64D 17/14
[58] Field of Search .................... 244/145, 142, 146

[56] References Cited

UNITED STATES PATENTS

| | | | |
|---|---|---|---|
| 3,393,885 | 7/1968 | Neumark | 244/145 |
| 3,412,963 | 11/1968 | Struble | 244/146 |
| 3,428,277 | 2/1969 | Everett | 244/146 X |
| 3,524,613 | 8/1970 | Reuter et al. | 244/142 |
| 3,724,789 | 4/1973 | Snyder | 244/145 |
| 3,749,337 | 7/1973 | Jalbert | 244/145 |

*Primary Examiner*—Trygve M. Blix
*Assistant Examiner*—Barry L. Kelmachter

[57] ABSTRACT

A maneuverable, ram air inflated, flexible aerial wing includes a plurality of adjacent, forward facing air cells having first openings along the leading edge thereof and a control surface extending between the aforesaid cells and the trailing edge. Generally rectangular in overall shape the cells are of such size and so positioned, and include rearward facing second openings, as to displace the separation point of the relative airflow across the upper surface further toward the trailing edge than with known devices, and which therefore achieves a higher lift to drag ratio. Further, the control line system and a series of rear vents combine to reduce the force required to lower the surface and help prevent erratic flight.

3 Claims, 10 Drawing Figures

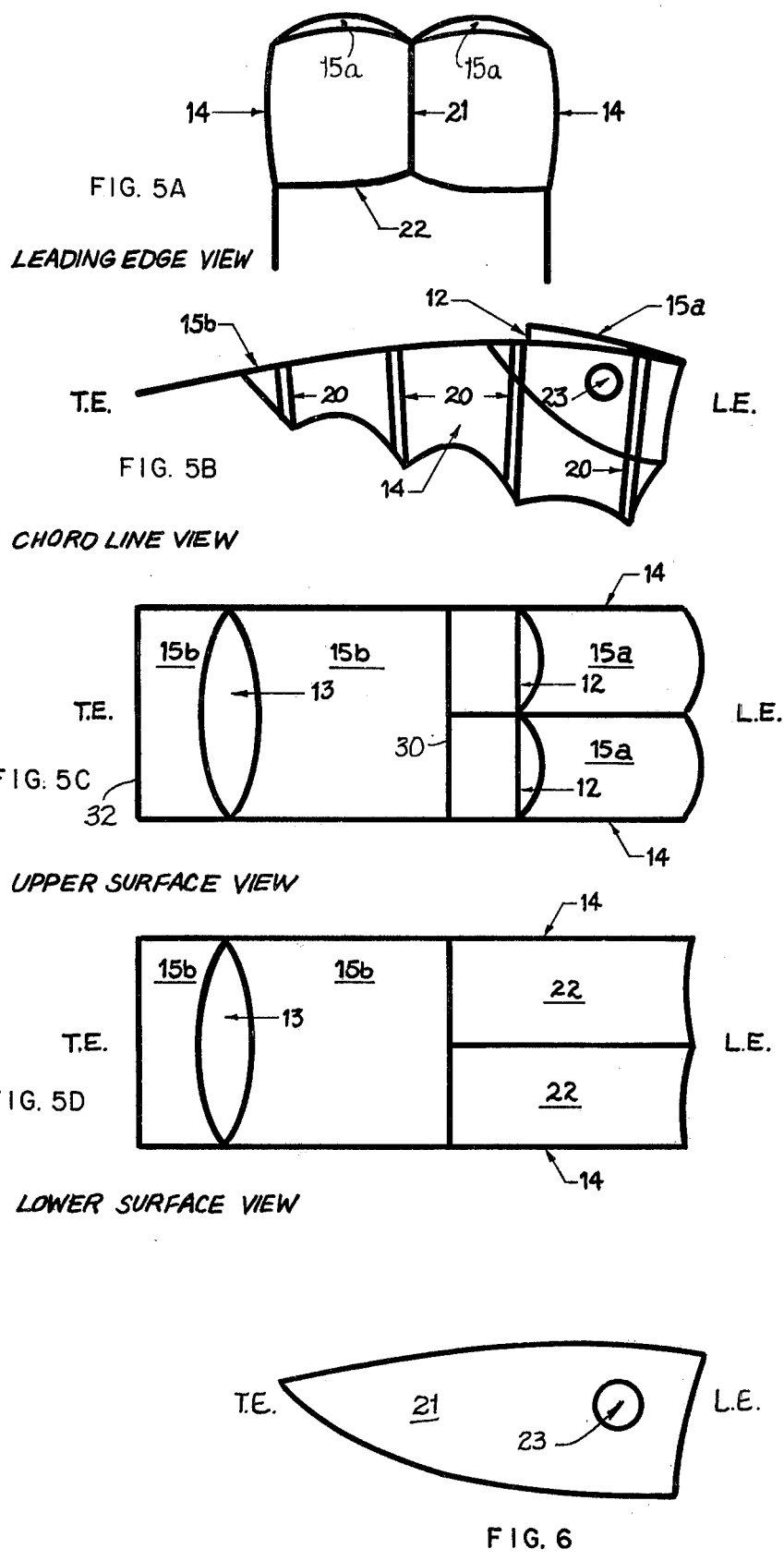

MANEUVERABLE, RAM AIR INFLATED, FLEXIBLE AERIAL WING

REFERENCE TO RELATED APPLICATION

This application is a continuation of our previously filed application Ser. No. 528,722 filed Dec. 2, 1974, now abandoned.

BACKGROUND OF THE INVENTION

Ram air inflated, multi-celled aerial wings or parachutes are well known to those skilled in the art. One of the most recent developments in this art is disclosed in U.S. Pat. No. 3,428,277 to Everett, which teaches the use of a ram air scoop located adjacent the leading edge of the canopy to hold this edge stiffly distended. U.S. Pat. No. 3,131,894 to Jalbert illustrates an aerial wing which is also multicelled and teaches the use of rearwardly facing air relief openings along the trailing edge of the canopy to relieve excessive pressure buildup under the canopy. Further U.S. Pat. No. 3,524,613 to Reuter et al shows a wing having partial scoops at the forward edge to insure an extended leading edge during flight.

Although these patents are illustrative of devices which represent significant advances in the field, they have thus far been limited insofar as lift to drag ratio is concerned and have also experienced problems with maneuverability.

SUMMARY OF THE INVENTION

The present invention overcomes many of these above problems through its unique design and positioning of air cells and scoops, which result in the rearward displacement of the separation point of the relative air flow over the canopy creating a higher lift to drag ratio.

Toward these ends, the present invention is directed to a flexible, inflatable wing provided with a plurality of partial air scoops or cells with entrances adjacent the leading edge thereof. The cells further include rearwardly opening scoops slightly forward of the rear of the cells, resulting in a high lift to drag ratio air flow over and through the canopy. This is particularly advantageous when it is necessary to release a payload some distance from its intended landing point and deliver it precisely to a predetermined point.

A unique suspension line system, wherein some lines are attached to other lines, reduces the total amount of line necessary and thus the bulk or packed volume of the chute.

As a further feature tending to improve the manipulation and control of descent, the rearward portion of the chute fabric includes a plurality of transverse slits or vents which decrease the drag on the control or rear surface and reduces the load required to lower it when desired.

It is therefore an object of the invention to provide a maneuverable, ram air inflated, flexible wing having an increased lift to drag ratio.

It is further an object of the present invention to provide an aerial wing having improved suspension line system.

Further objects of the present invention will be apparent to those skilled in the art when the following detailed description is studied in conjunction with the accompanying drawings in which:

FIGS. 5a–5d illustrates a frontal, chordline, upper surface and lower surface view of an individual cell.

FIG. 6 is a chordline view of a rib.

DETAILED DESCRIPTION OF THE PREFERRED EMBODIMENT

Figure 1:
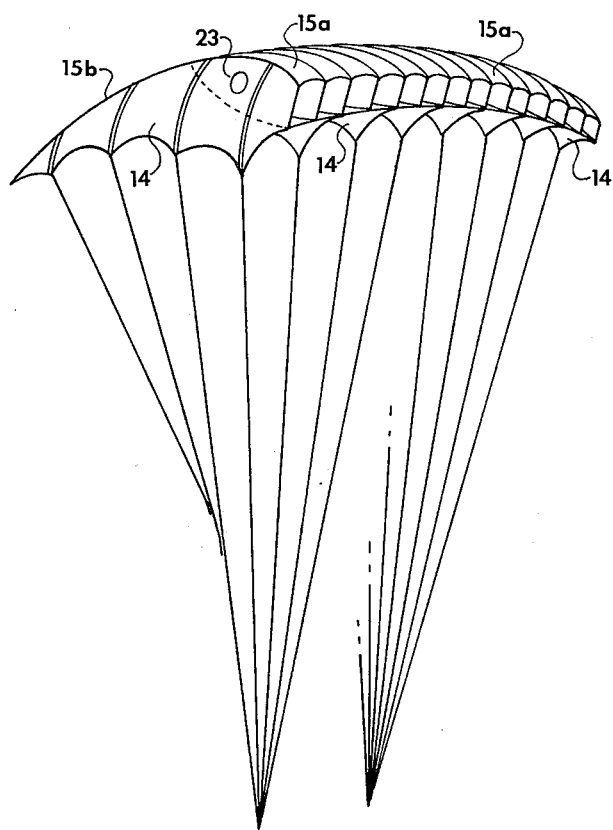
FIG. 1 is a perspective view of the invention, looking from the front corner and slightly above.

The aerial wing, in the preferred embodiment as shown in FIG. 1, consists of a rear portion or control surface and a forward portion formed of a plurality of adjacent, forward facing, ram air inflated, partial cells. Although partial cells are illustrated and described, the invention is equally applicable to full cells. Each cell includes an upper surface panel 15a, a small part of the panel 15b, two side panels 14 hereafter referred to as catenaries, a lower surface panel 22 and a central vertical rib 21 which joins the longitudinal center line of upper panels 15a,15b with the longitudinal center line of lower panel 22 to form two separate chambers in each cell and assists in maintaining cell shaping.

Figure 2:
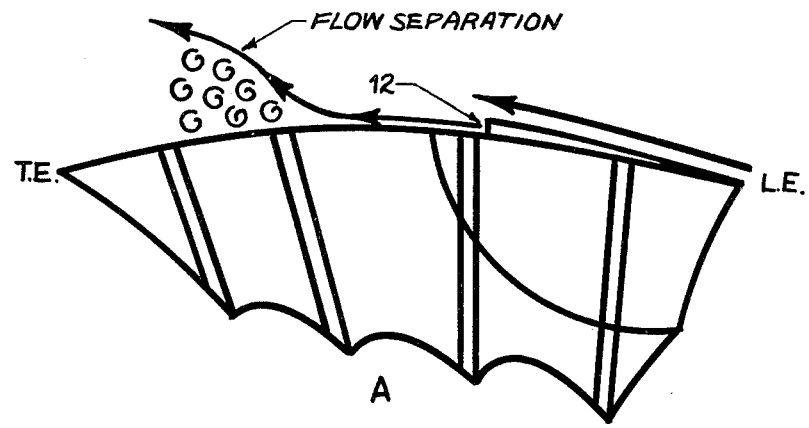
FIGS. 2A and 2B are comparisons of relative air flow patterns over the upper surface of prior multi-celled aerial devices (B) and the invention (A)
Figure 2:
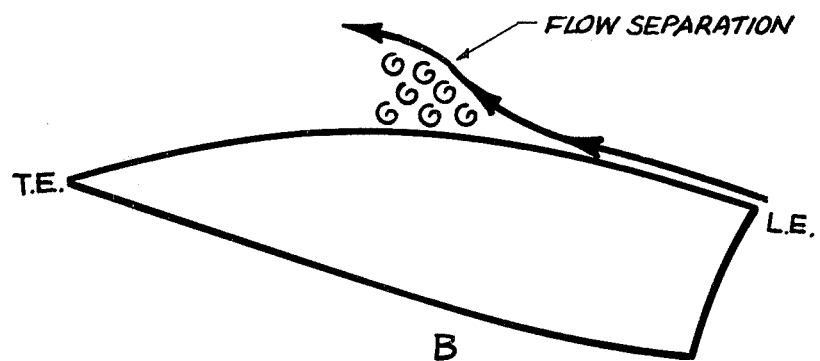

The upper surface panel 15a on each cell is provided at a point forwardly of the rear edge of the cell with rearward facing openings or outlet scoops 12. These scoops 12 serve to displace the separation point of the relative air flow over the invention's upper surface further towards its trailing edge. This results in increased lift and thus, a higher lift to drag ratio. An illustration of comparative upper surface air flows is shown in FIG. 2.

The trailing upper surface panel 15b of each cell extends from the termination line 30 of the forward portion aft to the trailing edge 32 to form a single membrane control surface, which, upon lowering of either or both sides thereof, performs flight maneuvers such as turns, spins, etc. and to modulate the invention's angle of attack. Located on this panel 15b in a transverse line, parallel to and spaced forwardly from the trailing edge, in a preferred embodiment, is a slit, or vent 13. These vents 13 decrease the drag created by the control surface and thus, reduce the load required to lower it. Furthermore, they help prevent erratic flight when the control surface is lowered to modulate the angle of attack.

Figure 3:
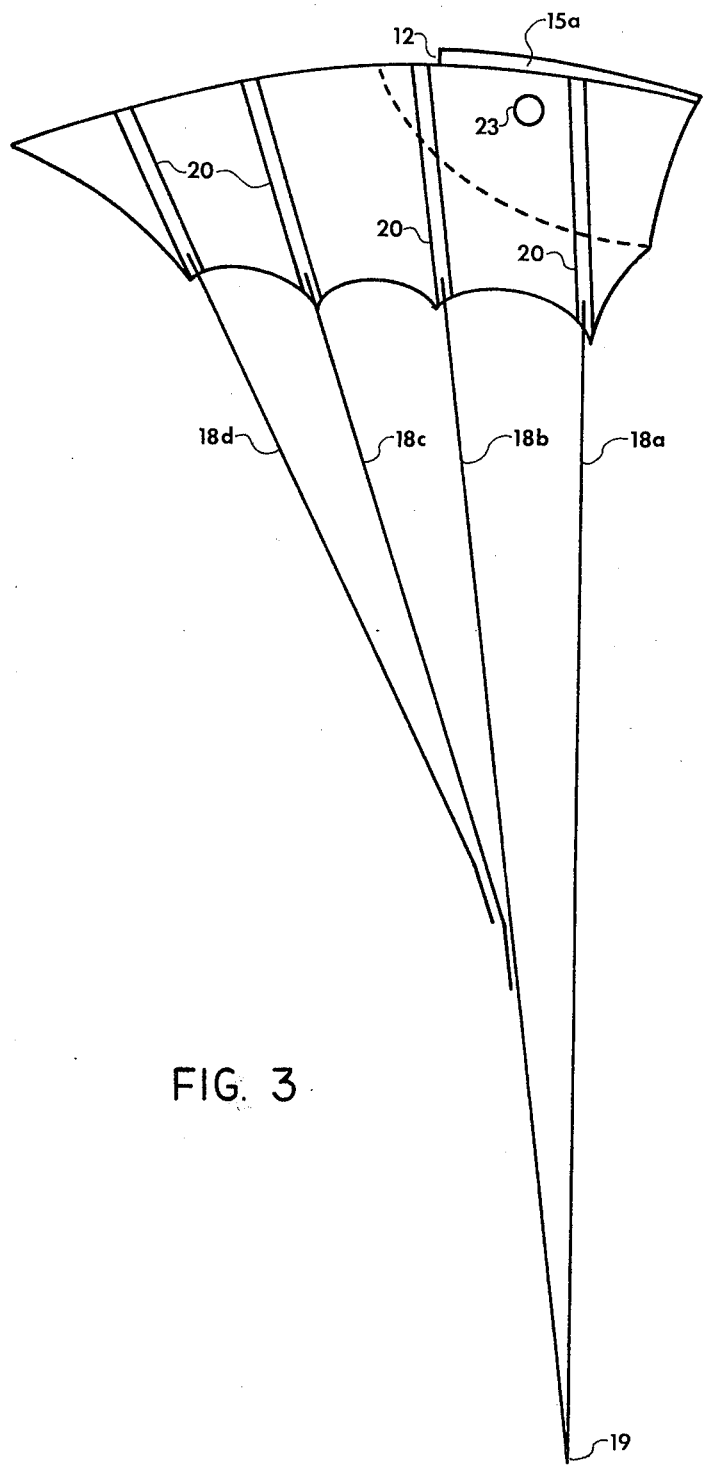
FIG. 3 is a chordline view of the invention in a typical configuration and includes the suspension line placement and rigging configuration.

The catenaries or side walls 14 of each cell are attached to the longitudinal edges of the upper surface panels 15a, 15b. They are generally wedge shaped except that their lower edge is contoured or scalloped to form four points. These points are used for suspension line attachment as in FIG. 3. This suspension line attachment point placement, in conjunction with the contouring used to form the points, distributes the suspension line loading evenly throughout the invention and thereby greatly assists in maintaining the desired shaping. Vertical and/or angular rows of tapes 20 are attached to the catenaries 14 for reinforcement. Excepting the left and right outermost catenaries 14, each may, if desired, include an orifice or port 23 which allows air to pass freely between the cells and enables a uniform pressurization to be maintained throughout them. See FIGS. 1, 3 and 5.

The central rib 21 of each cell is attached to the upper and lower surface panels 15a, 15b and 22 along their center chordlines. Thus, it divides each cell vertically into two equal chambers and assists in maintaining the desired shaping. Each rib 21 has ports 23, as do the catenaries 14, to assist in maintaining uniform pressurization in the cells. See FIGS. 5 and 6.

The suspension lines 18a, 18b, 18c and 18d are attached to the catenaries 14 at each of the four points along their lower edge. Suspension lines 18a and 18b extend downward to one or more load bearing points 19. Suspension lines 18c extend downward to, and are attached to, suspension lines 18b. Likewise, suspension lines 18d extend downward to, and are attached to, suspension lines 18c. This suspension line rigging configuration, whereby certain lines are attached to other lines rather than extending downward to a common load bearing point, reduces the amount of line required and thereby lowers the packed volume of the parachute. The line lengths are determined by the specific application for which the parachute is to be used. Each respective row of suspension lines may be equal in length if a transverse cathedral shaping is desired. Or, each row may be of graduated lengths to achieve a relatively flat, or ahedral, transverse shaping.

Figure 4:
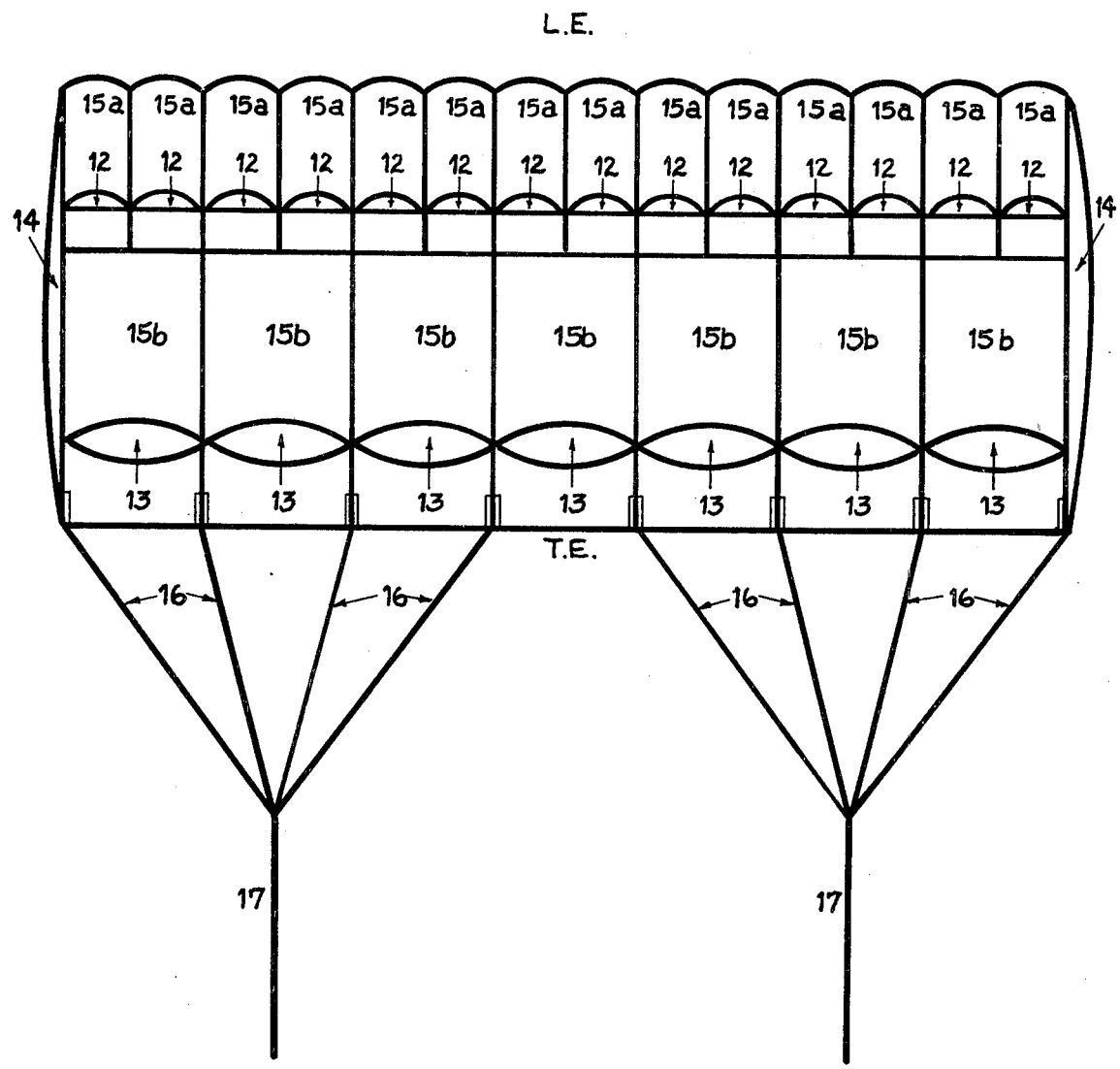
FIG. 4 is a view of the upper surface of the invention in a typical configuration and includes the control line placement and rigging configuration.

To lower the control surface to perform flight maneuvers and/or modulate the parachute's angle of attack, eight upper control lines 16 are attached at equally spaced intervals to the trailing edge. This number may be varied for specific applications. The control lines 16 extend downward to two common points, four lines at each point where they join two lower control lines 17. The lower control lines 17 extend downward to one or more previously mentioned load bearing points 19 as in FIGS. 3 and 4. By lowering either the left or right control line group, 16 and 17 left or 16 and 17 right, turns and spins may be performed. By lowering both groups of control lines 16 and 17 simultaneously, and subsequently the entire control surface, the parachute's glide angle and rate of descent may be varied. As shown in FIG. 1, each cell is open at its leading edge. The trailing edge 30 of each cell should preferably, but not necessarily be completely closed. The parachute may be constructed of any material having a porosity of approximately zero, such as nylon.

It is to be understood that the above description is of a preferred embodiment and is not intended to limit the scope of the invention. In addition to the variables specifically mentioned in the above description, others include: the number of cells; the type of cells (full, partial, etc); the number of rearward facing scoops 12 on the upper surface of each cell; number of vents 13 on the control surface; number of points on the lower edge of the catenaries 14; number of suspension and/or control lines 18a, 18b, 18c, 16, 17; the suspension and/or control line configuration; and the rigging configuration.

What is claimed is:

1. Improvements in ram air inflated parachutes of the type comprising a canopy formed of a flexible, non-porous fabric having a leading edge and a trailing edge, and a plurality of forwardly facing transversely adjacent air cells having an upper wall and a lower wall and extending from said leading edge toward said trailing edge and terminating along a cell termination line formed by the joining of said upper and lower walls, said improvements comprising means for displacing the separation point of the relative airflow over the upper surface of said canopy toward said trailing edge and providing more lift, said means comprising a transverse opening in the upper wall of at least some of said cells, said opening being positioned forwardly of said termination line and having the effect of moving said separation point further rearwardly toward said trailing edge.

2. The improvements according to claim 1 wherein said air cells extend only partially of the longitudinal distance between said leading edge and said trailing edge, thereby forming a forward partial cell section and a rear, single membrane control surface.

3. The improvements according to claim 2 and further including a plurality of second openings through the control surface along a line spaced from and parallel to said trailing edge to reduce the force necessary to lower the trailing edge and prevent erratic flight upon change of angle of attack.

* * * * *